United States Patent
Darmour et al.

(10) Patent No.: US 11,275,493 B1
(45) Date of Patent: Mar. 15, 2022

(54) SEMANTIC DETAIL SELECTION FOR OBJECT RESIZING

(71) Applicant: Oracle International Corporation, Redwood Shores, CA (US)

(72) Inventors: Jennifer Darmour, Seattle, WA (US); Arunachalam Murugan, Marietta, GA (US); Roberto Espinosa, Atlanta, GA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/246,261

(22) Filed: Apr. 30, 2021

Related U.S. Application Data

(60) Provisional application No. 63/129,240, filed on Dec. 22, 2020.

(51) Int. Cl.
*G06F 3/0484* (2013.01)
*G06N 20/00* (2019.01)
*G06F 3/04845* (2022.01)

(52) U.S. Cl.
CPC ......... *G06F 3/04845* (2013.01); *G06N 20/00* (2019.01); *G06F 2203/04806* (2013.01)

(58) Field of Classification Search
None
See application file for complete search history.

(56) References Cited

U.S. PATENT DOCUMENTS

| | | | |
|---|---|---|---|
| 2005/0229110 A1* | 10/2005 | Gegner | G16H 40/63 715/800 |
| 2013/0198685 A1* | 8/2013 | Bernini | G16H 40/63 715/800 |
| 2014/0109002 A1* | 4/2014 | Kimball | G06F 3/04842 715/800 |
| 2020/0209013 A1* | 7/2020 | Kornev | G06N 20/00 |

* cited by examiner

*Primary Examiner* — Henry Orr
(74) *Attorney, Agent, or Firm* — Invoke

(57) ABSTRACT

Techniques for displaying content based on interface scale are disclosed. A system may display, within an interface, a plurality of elements corresponding respectively to a plurality of sets of content. A display size of each of the elements is based on a user-selected zoom level. Responsive to receiving user input selecting a first zoom level for the interface, the system determines a first display size for an element, for displaying the element within the interface. The element is associated with a particular set of content. A first data set in the particular set of content is ranked higher than a second data set in the particular set of content. Based at least on the first display size, the system may select the first data set of the particular set of content for displaying within the element without selecting the second data set of the particular set of content for displaying.

17 Claims, 4 Drawing Sheets

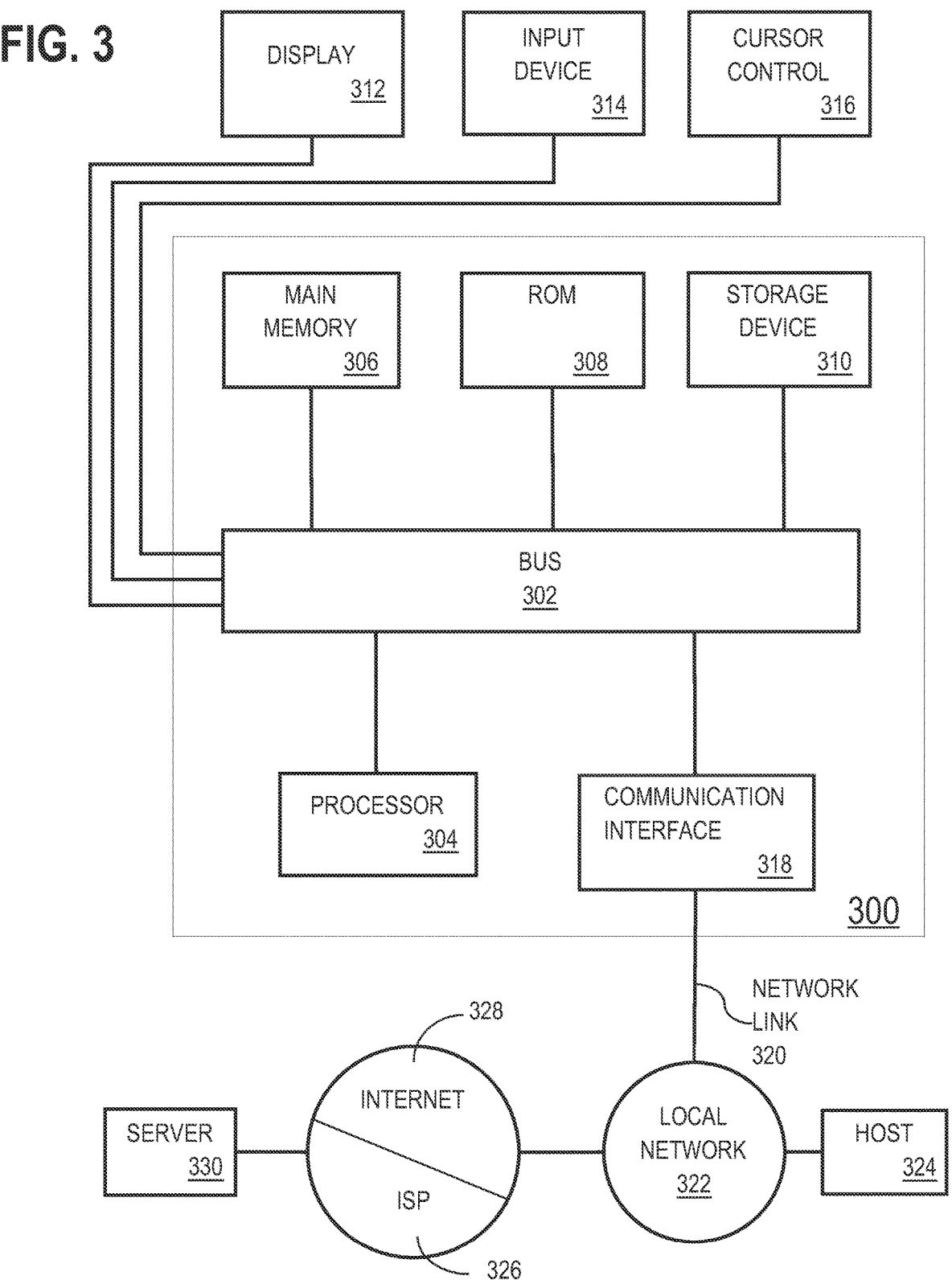

SEMANTIC DETAIL SELECTION FOR OBJECT RESIZING

INCORPORATION BY REFERENCE; DISCLAIMER

This application is hereby incorporated by reference: Application No. 63/129,240 filed on Dec. 22, 2020. The Applicant hereby rescinds any disclaimer of claim scope in the parent application or the prosecution history thereof and advises the USPTO that the claims in this application may be broader than any claim in the parent application.

TECHNICAL FIELD

The present disclosure relates adjusting display of elements of a graphical user interface (GUI) based on adjustments to a zoom level of the GUI.

BACKGROUND

A Graphical User Interface (GUI) is a form of user interface that allows users to interact with electronic devices through graphical icons instead of text-based user interfaces, typed command labels or text navigation. Content that can be displayed using a GUI is typically limited by a size and/or resolution of a screen used to display the GUI.

Graphical icons that make up the GUI may be sized and shaped based on properties represented by the icon. For example, in a scheduling application for scheduling meetings, an icon may be sized based meeting duration. In a map application for displaying location of physical objects, an icon may be sized based on a relative size of the physical object. The size of the icon may limit the information able to be displayed within the icon.

Accordingly, within a visual display such as a Gantt chart or physical space map, each component may be represented with a small interface element when zoomed out. The small interface elements show only a portion of the data associated with the interface element, and do not display all the relevant information. As an example, in a zoomed out display, a user can see a block representing an operation but can only see certain data associated with the operation based on the size of the interface element.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3 shows a block diagram that illustrates a computer system in accordance with one or more embodiments.

DETAILED DESCRIPTION

Figure 1A:
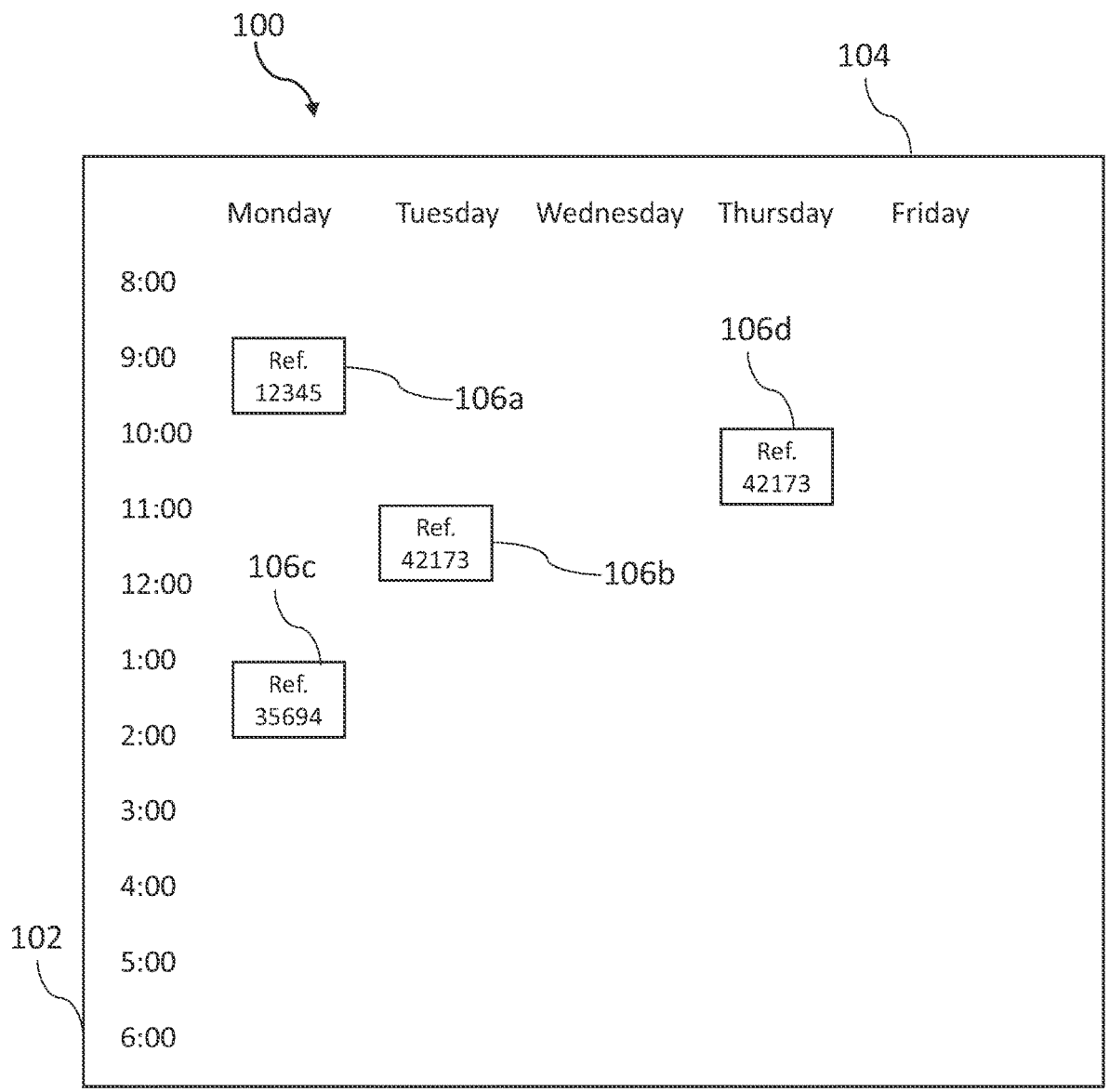
FIG. 1A illustrates an interface at a first zoom level in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. DISPLAYING CONTENT IN A GRAPHICAL USER INTERFACE
3. RANKING CONTENT ASSOCIATED WITH AN INTERFACE ELEMENT
4. DISPLAYING CONTENT BASED ON INTERFACE SCALE
5. MISCELLANEOUS; EXTENSIONS
6. HARDWARE OVERVIEW

1. General Overview

An application may display a set of data within an interface element. However, zooming out may reduce a size of the interface element, leaving insufficient space to display the entire set of data within the interface element. One or more embodiments select a particular subset of data for display within an interface element based on (a) an amount of data that can be displayed within the interface element at the current size of the interface element and (b) a ranking of each of the subsets of data. Furthermore, the system may abbreviate one or more displayed subsets of data when a size of the interface element does not allow for display of the subsets of data without abbreviation.

The subset of data, to be displayed within an interface element, may be selected based on an importance of the subset of data. In an example, an interactive element, such as an approve button, may be selected and displayed within the interface element. A description of the item being approved may be truncated for display within the interface element.

One or more embodiments train a machine learning model to select a subset of data, of the data associated with an interface element, to be displayed within the interface element. The system trains a machine learning model based on historical user interaction data. The historical user interaction data identifies subsets of data, from a set of data corresponding to a user interface element, that were selected or otherwise interacted with by a user. The characteristics of the subsets of data (e.g., data type, data format, etc.) are used to train the machine learning model. The system applies the trained machine learning model to a current data set corresponding to a target interface element that is to be displayed. The trained machine learning model may identify the subsets of data, of the current data set, to be displayed within the target interface element. The machine learning model may, for example, be trained to identify subsets of data that are most likely to be selected or otherwise interacted with by a user. The subsets of data, identified by the machine learning model, are displayed within the available visual space corresponding to the interface element.

2. Displaying Content in a Graphical User Interface

Figure 1B:
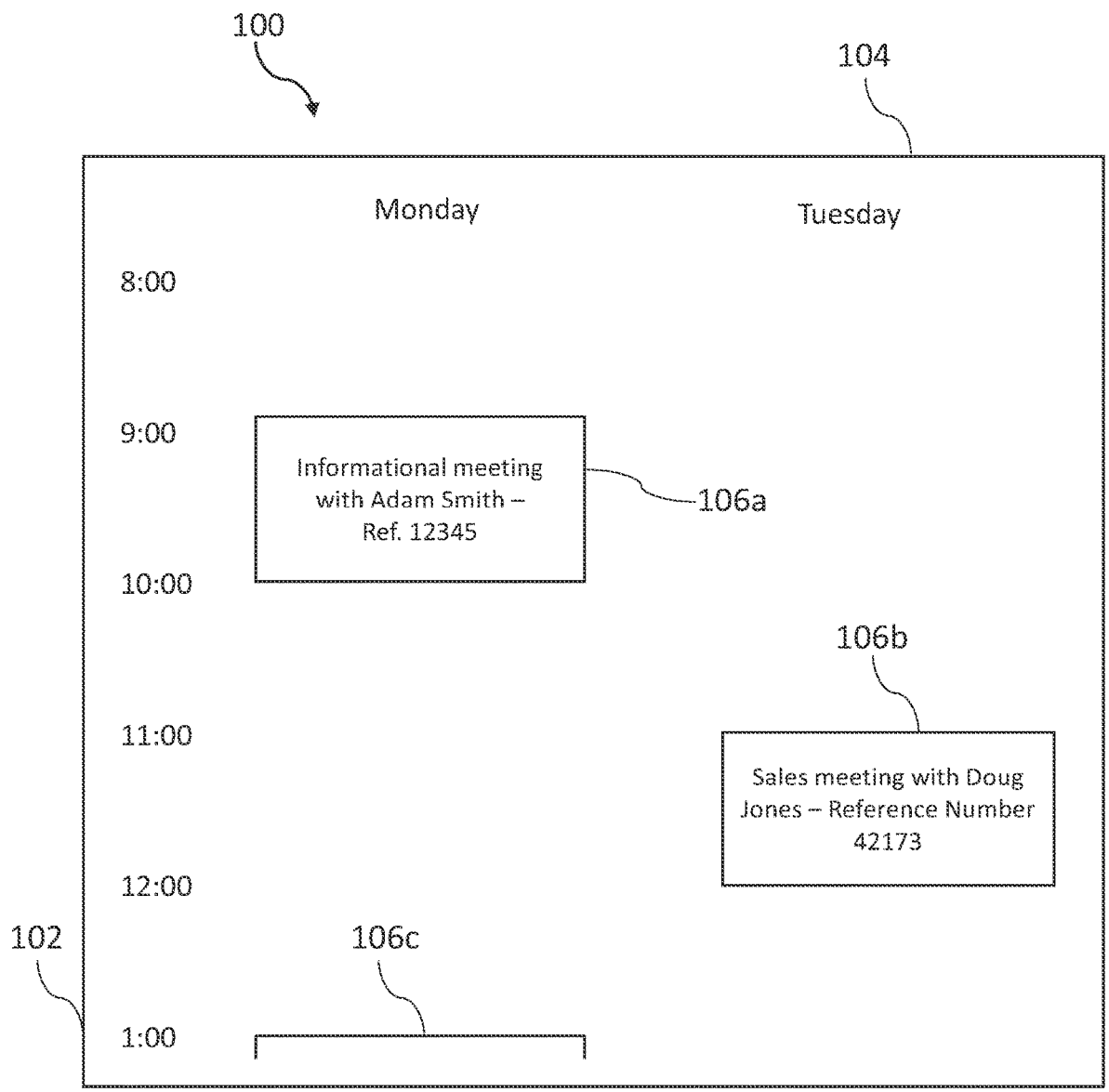
FIG. 1B illustrates the interface at a second zoom level in accordance with one or more embodiments.

FIGS. 1A and 1B show a graphical user interface (GUI) 100. One use for a GUI is a As a particular example, the GUI 100 shown in FIGS. 1A and 1B is scheduling application, but various other GUIs, such as a Gantt chart or a physical space map or schedule are contemplated. The scheduling application includes a vertical axis 102 showing time of day, and a horizontal axis 104 showing day of the week. The scheduling application includes a plurality of interface elements 106 that correspond to activities, such as meetings or appointments. That is, each activity is represented by a corresponding interface element 106 displayed in the GUI 100. A size of each interface element 106 may be determined, at least in part, by the scale of the interface. As a particular example, in the case of the scheduling application shown in FIGS. 1A and 1B, the size of the interface elements 106 associated with the activities is based at least in part of the size of the time units in the vertical axis 102.

A user can control the scale of the horizontal and/or vertical axes int eh GUI by selecting a zoom level for the GUI. A lower zoom level (e.g., being zoomed out) causes a larger number of time units to be displayed within a smaller area, thus causing each interface element to be smaller when compared to a higher zoom level (e.g., being zoomed in). For example, as shown in FIG. 1A, a schedule is viewed at a relatively low zoom level, showing interface elements 106a-106d, where each interface element has a relatively small size. In contrast, FIG. 1B shows the same schedule at a higher zoom level. Interface elements 106a and 106b remain fully visible, while interface element 106c is partially visible and interface element 106d is not displayed because the time at which the activity corresponding to interface element 106d is to occur is no longer displayed within the interface.

In embodiments each interface element 106 is associated with a set of data or content, including one or more data items. Each of the data items may be intended for display within the interface element. However, because the size of the interface element varies based on the selected zoom level, not all data items can be displayed within the interface element at all times. That is, at a lower zoom level (e.g., when zoomed out), a size of an interface element may be too small to display all data items within the interface element. Thus, only a first subset of the data items associated with the interface element may be displayed within the interface element, while a second subset of the data items is not displayed within the interface element. As an example, the interface element 106a is related to an activity including the data set "Informational meeting with Adam Smith—Ref. 12345", and interface element 106b is related to an activity including the data set "Sales meeting with Doug Jones—Reference Number 42173".

As shown in FIG. 1A, when the GUI is displayed at a lower zoom level, only the reference number is shown inside interface element 106a. However, as shown in FIG. 1B, when the GUI is displayed at a relatively higher zoom level, the entire data set is displayed within the interface element.

In particular, interface element 106a is associated with the text "Informational meeting with Adam Smith—Ref. 12345". As shown in FIG. 1B, at a higher zoom level (e.g., a zoomed-in view) the interface element 106a shows the entire text "Informational meeting with Adam Smith—Ref. 12345" within the interface element. As shown in FIG. 1A, at a lower zoom level (e.g., a zoomed-out view) of the interface element 106a (e.g., where the interface element includes insufficient real estate to display the entire text), the system shows text "Ref. 12345" within the interface element 106a. That is, the text associated with the interface element 106a is truncated and only a position of the text (e.g., the text associated with the reference number) is displayed within the interface element 106a in a zoomed-out view.

Interface element 106b is associated with the text "Sales meeting with Doug Jones—Reference Number 42173". As shown in FIG. 1B, at a higher zoom level (e.g., a zoomed-in view) the interface element 106b shows the entire text "Sales meeting with Doug Jones—Reference Number 42173" within the interface element. As shown in FIG. 1A, at a lower zoom level (e.g., a zoomed-out view) of the interface element 106b (e.g., where the interface element includes insufficient real estate to display the entire text), the system shows text "Ref. 42173" within the interface element 106b. That is, the text associated with the interface element 106b is truncated to include only a position of the text (e.g., the text associated with the reference number), and the truncated portion of the text is abbreviated (e.g., the text "Reference Number" is abbreviated as "Ref.") and displayed within the interface element 106b in a zoomed-out view.

3. Ranking Content Associated with an Interface Element

A system may include a data set associated with a particular interface element displayed in a graphical user interface (GUI). The data set may include one or more data items that are associated with the interface element. As one example, a calendar or scheduling interface may store, in association with an interface element representing a meeting, date and time information, duration information, meeting attendee information, meeting subject information, a meeting reference number, and/or an indication of meeting acceptance. As another example, in a Gantt chart, a scheduling interface may store, in association with an interface element representing an activity, a manager identifier, a project identifier, and/or an indication of project acceptance. The data set associated with an interface element man include many types of data items.

In some embodiments, the data set may be received by the system as a set of individual data items. Alternatively, the data set may be received as a single data item, and the system may divide the data set into multiple data items. That is, the system may parse the received data set, performing an entity extraction process to divide the data set into individual data items. There are many parsing techniques capable of dividing the data set into individual data items.

In aspects, the data items may be categorized. As an example, the data items may be categorized based on whether the data item requires action by a user (e.g., an indication of acceptance) or whether a data item is informational. Alternatively or additionally, informational data items may be categorized separately. For example, as discussed above with respect to a calendar or scheduling application, informational data items may be separated into categories such as subject (e.g., subject and reference number), logistics (e.g., date and time information, duration information), and contact information (e.g., meeting attendee information).

In an embodiment, a machine learning engine is used to rank the data items that make up the data set. Machine learning includes various techniques in the field of artificial intelligence that deal with computer-implemented, user-independent processes for solving problems that have variable inputs. The machine learning model may also be used to select a subset of the data items associated with an interface element to be displayed within the interface element.

In some embodiments, the machine learning engine trains a machine learning model to perform one or more operations. Training a machine learning model uses training data to generate a function that, given one or more inputs to the machine learning model, computes a corresponding output. For example, the training data may include historical usage or interaction data from users indicating a subset of data items, corresponding to a user interface item, that were most often selected, interacted with, or otherwise referred to by a user when accessing an interface. The characteristics of the subset of data (e.g., data type, data format, etc.) are used to train the machine learning model. The output may correspond to a prediction based on prior machine learning. In an embodiment, the output includes a ranking assigned to the provided input(s). The machine learning model corresponds to a learned model for performing the desired operation(s) (e.g., labeling, classifying, and/or categorizing inputs). A system may use multiple machine learning engines and/or multiple machine learning models for different purposes.

In an embodiment, the machine learning engine may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine receives positive and/or negative reinforcement in the process of attempting to solve a particular problem (e.g., to optimize performance in a particular scenario, according to one or more predefined performance criteria). In an embodiment, the machine learning engine initially uses supervised learning to train the machine learning model and then uses unsupervised learning to update the machine learning model on an ongoing basis.

In an embodiment, a machine learning engine may use many different techniques to label, classify, rank, and/or categorize inputs. A machine learning engine may transform inputs into feature vectors that describe one or more properties ("features") of the inputs. The machine learning engine may label, classify, rank, and/or categorize the inputs based on the feature vectors. Alternatively or additionally, a machine learning engine may use clustering (also referred to as cluster analysis) to identify commonalities in the inputs. The machine learning engine may group (i.e., cluster) the inputs based on those commonalities. The machine learning engine may use hierarchical clustering, k-means clustering, and/or another clustering method or combination thereof. In an embodiment, a machine learning engine includes an artificial neural network. An artificial neural network includes multiple nodes (also referred to as artificial neurons) and edges between nodes. Edges may be associated with corresponding weights that represent the strengths of connections between nodes, which the machine learning engine adjusts as machine learning proceeds. Alternatively or additionally, a machine learning engine may include a support vector machine. A support vector machine represents inputs as vectors. The machine learning engine may label, classify, rank, and/or categorizes inputs based on the vectors. Alternatively or additionally, the machine learning engine may use a naïve Bayes classifier to label, classify, rank, and/or categorize inputs. Alternatively or additionally, given a particular input, a machine learning model may apply a decision tree to predict an output for the given input. Alternatively or additionally, a machine learning engine may apply fuzzy logic in situations where labeling, classifying, and/or categorizing an input among a fixed set of mutually exclusive options is impossible or impractical. The aforementioned machine learning model and techniques are discussed for exemplary purposes only and should not be construed as limiting one or more embodiments.

In an embodiment, the machine learning model may be trained to determine a rank for each data item within a data set. For example, the machine learning model may be trained based on data items historically referred to by users when interacting with a same or similar data set, and may determine a relative and/or absolute rank associated with each data item based on the historical data. For example, the system may determine an absolute rank using a relevance score or importance score (e.g., the system may compute a relevance score of 85 for a particular data item), or a relative rank (e.g., a first data item is determined to be more relevant than a second data item).

In an embodiment, as a machine learning engine applies different inputs to a machine learning model, the corresponding outputs are not always accurate. As an example, the machine learning engine may use supervised learning to train a machine learning model. After training the machine learning model, if a subsequent input is identical to an input that was included in labeled training data and the output is identical to the supervisory signal in the training data, then output is certain to be accurate. If an input is different from inputs that were included in labeled training data, then the machine learning engine may generate a corresponding output that is inaccurate or of uncertain accuracy. In addition to producing a particular output for a given input, the machine learning engine may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

For example, after training the machine learning model, the system may apply the trained machine learning model to a current data set corresponding to a target interface element that is to be displayed. The trained machine learning model may rank data items and/or identify the subsets of data, of the current data set, to be displayed within the target interface element. The machine learning model may, for example, be trained to identify subsets of data that are most likely to be selected or otherwise interacted with by a user. The subsets of data that are identified by the machine learning model may be displayed within the available visual space corresponding to the interface element.

4. Displaying Content Based on Interface Scale

Figure 2:
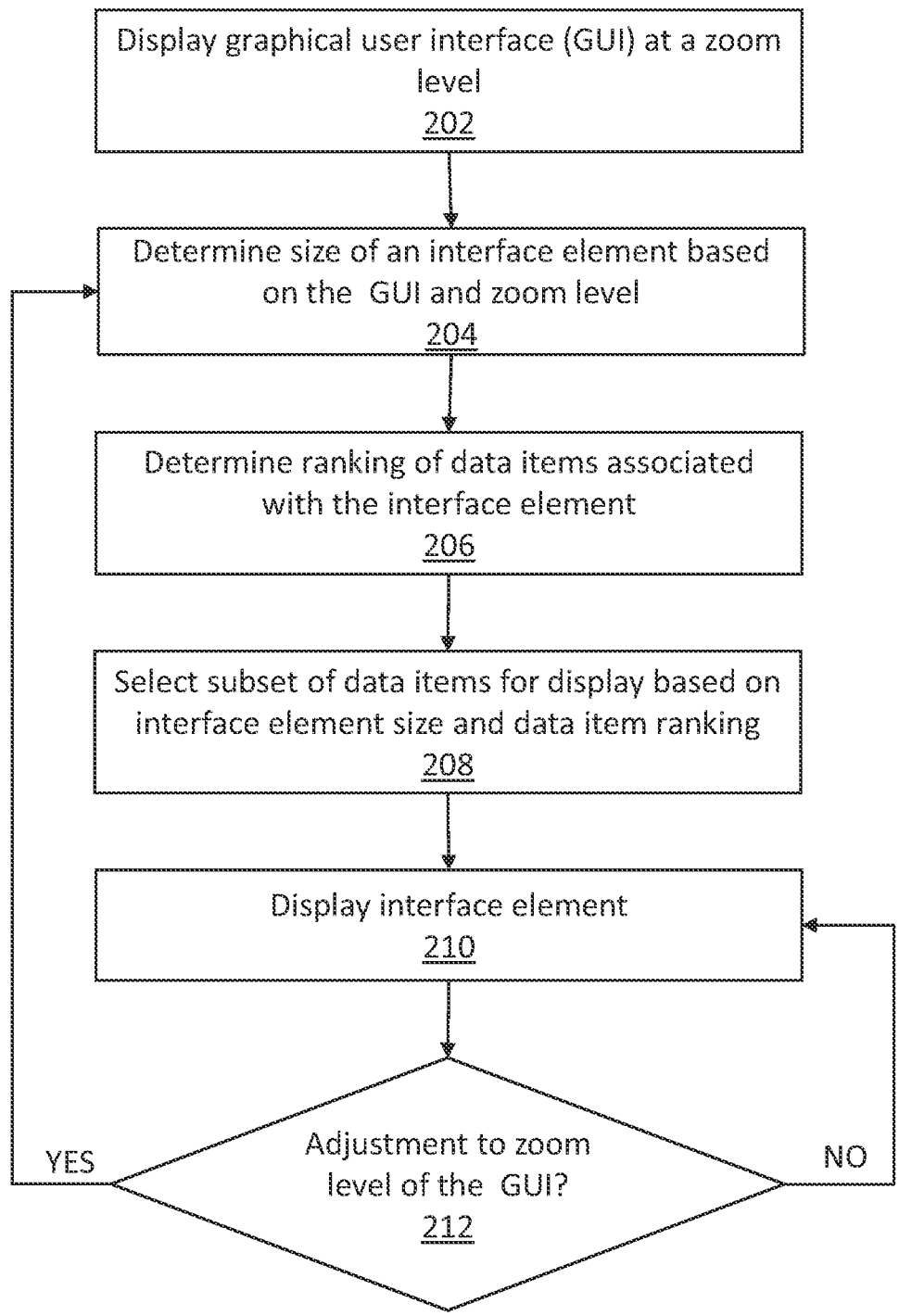
FIG. 2 illustrates an example set of operations for displaying content based on interface scale in accordance with one or more embodiments.

FIG. 2 illustrates an example set of operations for displaying content based on an interface scale in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a system can display a graphical user interface (GUI) on which a plurality of interface objects are to be displayed (Operation 202). The GUI may be displayed in many contexts, including, for example, a geographical map, a functional chart, such as a flow chart, a Gantt chart, or an organizational chart. There are many contexts for which a GUI is appropriate.

In embodiments, the GUI may be displayed such that it encompasses the entirety of a display used by the user. Alternatively, the GUI may be displayed as a portion of the display used by the user. For example, the GUI may be displayed in a window of a windowed interface. The system may receive a zoom level at which the GUI is to be displayed initially. In embodiments, the zoom level may be selected by a user. In other embodiments, the system may select an initial zoom level for display of the GUI.

The system may determine a size of an interface element to be displayed within the GUI (Operation 204). That is, the system may determine one or more dimensions of the interface element. For example, the system may scale length and/or width of the interface element. In embodiments, the one or more dimensions may be adjusted based on a zoom level of the interface. For example, one or more of the length and/or the width may be specified based on a scale of the interface. As a particular example, when displaying a Gantt chart, the interface may include a horizontal axis divided into units representing hours, and an interface element may have a width specified by a number of hours the activity is projected to consume. As another particular example, when displaying a GUI representing a physical map, the interface may include horizontal and vertical axes divided into units representing physical length (e.g., feet, miles, etc.), and at least one dimension of the interface element may be specified based on the physical lengths represented in the GUI.

The system may determine a ranking for a set of data items associated with the interface element (Operation 206). The ranking of data items may be determined based on one or more factors discussed above.

The system may select a subset of data items for display within the interface element (Operation 208). In embodiments, the subset of data items may be selected based on their respective rankings. The system may select items based on their respective rankings and the size of the interface element. For example, the system may determine a number of data items that fit within the interface element based on the size of the interface element. Once the number of data items is determined, the system may select the subset of data items based at least in part on their respective rankings. In some embodiments, the system may select the subset of data items based on additional factors, such as a category associated with the data item. For example, the system may impose a threshold on the number of items from each category that may be selected in the subset of data items.

In some embodiments, the system may abbreviate one or more data items from the selected subset of data item. In particular, the system may abbreviate one or more data items when a size of the interface element does not allow for display of the subsets of data without abbreviation. The abbreviation may include truncating the one or more data items and/or replacing at least a portion of one or more of the data items with an abbreviated element (for example, replacing a word with a well-understood abbreviation of the word).

The system may display the interface element within the GUI (Operation 210). Displaying the interface element may include displaying the interface element and the subset of selected data items. Displaying the interface element may include refraining from displaying data items other than those included in the selected subset of data items.

In some embodiments, the system may rely only on the respective rankings of the data items to determine which data items are included in the subset of data items to be displayed. That is, the rankings may be determined as discussed above, and the subset of data items to be displayed within the interface element may be selected such that the highest-ranked data items are included in the subset.

In other embodiments, the system may rely on other factors in selecting the subset of data items. As an example, the system may divide the set of data items into multiple categories, and rank each category separately. The system may select one or more data items from each of one or more of the multiple categories. In some embodiments, the system may apportion the amount of space within the interface element evenly among the multiple categories. In other embodiments, more space may be allocated to a particular category, while less space is allocated to one or more other categories.

In some embodiments, a number of items in the subset may be selected such that each of the subset of items is fully displayed within the interface element. In other embodiments, the system may select a fixed number of items in the subset of data items, and may display only the fixed number.

The system may determine if an adjustment is made to the zoom level of the GUI (Operation 212). For example, a user may manually adjust a zoom level. Responsive to an adjustment to a zoom level (YES at Operation 212), the system may return to Operation 204 to re-render the GUI elements and display the GUI and interface elements at the requested zoom level. Alternatively (e.g., NO at Operation 212), the system may return to Operation 210 to continue displaying the GUI and interface elements at the current zoom level.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
displaying, within a Graphical User Interface (GUI), a plurality of interface elements corresponding respectively to a plurality of sets of content, wherein a display size of each of the interface elements is based at least on a user-selected zoom level;
responsive to receiving user input selecting a first zoom level for the interface:
determining a first display size for a particular interface element, of the plurality of interface elements, for display of the particular interface element within the interface based on the first zoom level;
wherein the particular interface element is associated with a particular set of content in the plurality of sets of content;
wherein a first data set in the particular set of content is ranked higher than a second data set in the particular set of content;
based at least on the first display size for the particular interface element, determining an amount of the particular set of content that can be displayed within the particular interface element;
based on the amount of the particular set of content that can be displayed within the particular interface element:
selecting the first data set of the particular set of content for displaying within the particular interface element without selecting the second data set of the particular set of content for displaying within the particular interface element, wherein the first data set is selected based at least on the first data set being ranked higher than the second data set, wherein the first data set is ranked higher than the second data set based at least on the first data set including an interactive element and the second data set not including an interactive element;
displaying, within the GUI, the particular interface element with a first display size, wherein the first data set is displayed within the particular interface element and the second data set is not displayed within the particular interface element;
responsive to receiving user input selecting a second zoom level for the interface:
determining a second display size for the particular interface element for display of the particular interface element within the interface based on the second zoom level;
based at least on the second display size for the particular interface element, determining a second amount of the particular set of content that can be displayed within the particular interface element;
based on the second amount of the particular set of content that can be displayed within the particular interface element:
selecting both the first data set of the particular set of content and the second data set for the particular set of content displaying within the particular interface element;
displaying, within the GUI, the particular interface element with a second display size, wherein the first data set and the second data set are displayed within the particular interface element.

2. The medium of claim 1, wherein the first data set of the particular set of content is located subsequent to the second data set of the particular set of content.

3. The medium of claim 1, the operations further comprising:
determining that the first data set includes an interactive element and the second data set does not include an interactive element;
wherein the first data set in the particular set of content is ranked higher than the second data set in the particular set of content based on the first data set including an interactive element and the second data set not including an interactive element.

4. The medium of claim 1, the operations further comprising:
training a machine learning model to compute a ranking corresponding respectively to each data set of the particular set of content, the training comprising:
obtaining training data sets, each training data set of historical data comprising historical data associated with actions of one or more users, wherein the historical data indicates the one or more users navigate to data sets of a first type more frequently than data sets of a second type;
training the machine learning model based on the training data sets;
receiving a communication from a supplier comprising a first set of content including a plurality of data sets;
applying the machine learning model to compute a respective ranking for each of the plurality of data sets of the first set of content, the applying comprising:
analyzing the set of content to determine a respective set of attributes associated with each data set; and
computing a respective ranking based on the data set and the first set of attributes associated with the data set, such that the first data set in the particular set of content is ranked higher than the second data set in the particular set of content.

5. The medium of claim 4, wherein the first data set and the second data set are part of a same category.

6. The medium of claim 4, wherein the first data set and the second data set are part of different categories.

7. A method comprising:
displaying, within a Graphical User Interface (GUI), a plurality of interface elements corresponding respectively to a plurality of sets of content, wherein a display size of each of the interface elements is based at least on a user-selected zoom level;
responsive to receiving user input selecting a first zoom level for the interface:
determining a first display size for a particular interface element, of the plurality of interface elements, for display of the particular interface element within the interface based on the first zoom level;
wherein the particular interface element is associated with a particular set of content in the plurality of sets of content;
wherein a first data set in the particular set of content is ranked higher than a second data set in the particular set of content;
based at least on the first display size for the particular interface element, determining an amount of the particular set of content that can be displayed within the particular interface element;

based on the amount of the particular set of content that can be displayed within the particular interface element:

selecting the first data set of the particular set of content for displaying within the particular interface element without selecting the second data set of the particular set of content for displaying within the particular interface element, wherein the first data set is selected based at least on the first data set being ranked higher than the second data set, wherein the first data set is ranked higher than the second data set based at least on the first data set including an interactive element and the second data set not including an interactive element;

displaying, within the GUI, the particular interface element with a first display size, wherein the first data set is displayed within the particular interface element and the second data set is not displayed within the particular interface element;

responsive to receiving user input selecting a second zoom level for the interface:

determining a second display size for the particular interface element for display of the particular interface element within the interface based on the second zoom level;

based at least on the second display size for the particular interface element, determining a second amount of the particular set of content that can be displayed within the particular interface element;

based on the second amount of the particular set of content that can be displayed within the particular interface element:

selecting both the first data set of the particular set of content and the second data set for the particular set of content displaying within the particular interface element;

displaying, within the GUI, the particular interface element with a second display size, wherein the first data set and the second data set are displayed within the particular interface element;

wherein the method is performed by at least one device including a hardware processor.

8. The method of claim 7, wherein the first data set of the particular set of content is located subsequent to the second data set of the particular set of content.

9. The method of claim 7, the operations further comprising:

determining that the first data set includes an interactive element and the second data set does not include an interactive element;

wherein the first data set in the particular set of content is ranked higher than the second data set in the particular set of content based on the first data set including an interactive element and the second data set not including an interactive element.

10. The method of claim 7, the operations further comprising:

training a machine learning model to compute a ranking corresponding respectively to each data set of the particular set of content, the training comprising:

obtaining training data sets, each training data set of historical data comprising historical data associated with actions of one or more users, wherein the historical data indicates the one or more users navigate to data sets of a first type more frequently than data sets of a second type;

training the machine learning model based on the training data sets;

receiving a communication from a supplier comprising a first set of content including a plurality of data sets;

applying the machine learning model to compute a respective ranking for each of the plurality of data sets of the first set of content, the applying comprising:

analyzing the set of content to determine a respective set of attributes associated with each data set; and computing a respective ranking based on the data set and the first set of attributes associated with the data set, such that the first data set in the particular set of content is ranked higher than the second data set in the particular set of content.

11. The method of claim 10, wherein the first data set and the second data set are part of a same category.

12. The method of claim 10, wherein the first data set and the second data set are part of different categories.

13. A system comprising:

at least one device including a hardware processor;

the system being configured to perform operations comprising:

displaying, within a Graphical User Interface (GUI), a plurality of interface elements corresponding respectively to a plurality of sets of content, wherein a display size of each of the interface elements is based at least on a user-selected zoom level;

responsive to receiving user input selecting a first zoom level for the interface:

determining a first display size for a particular interface element, of the plurality of interface elements, for display of the particular interface element within the interface based on the first zoom level;

wherein the particular interface element is associated with a particular set of content in the plurality of sets of content;

wherein a first data set in the particular set of content is ranked higher than a second data set in the particular set of content;

based at least on the first display size for the particular interface element, determining an amount of the particular set of content that can be displayed within the particular interface element;

based on the amount of the particular set of content that can be displayed within the particular interface element:

selecting the first data set of the particular set of content for displaying within the particular interface element without selecting the second data set of the particular set of content for displaying within the particular interface element, wherein the first data set is selected based at least on the first data set being ranked higher than the second data set, wherein the first data set is ranked higher than the second data set based at least on the first data set including an interactive element and the second data set not including an interactive element;

displaying, within the GUI, the particular interface element with a first display size, wherein the first data set is displayed within the particular interface element and the second data set is not displayed within the particular interface element;

responsive to receiving user input selecting a second zoom level for the interface:

determining a second display size for the particular interface element for display of the particular interface element within the interface based on the second zoom level;

based at least on the second display size for the particular interface element, determining a second amount of the particular set of content that can be displayed within the particular interface element;

based on the second amount of the particular set of content that can be displayed within the particular interface element:

selecting both the first data set of the particular set of content and the second data set for the particular set of content displaying within the particular interface element;

displaying, within the GUI, the particular interface element with a second display size, wherein the first data set and the second data set are displayed within the particular interface element.

14. The system of claim 13, wherein the first data set of the particular set of content is located subsequent to the second data set of the particular set of content.

15. The system of claim 13, the operations further comprising:

determining that the first data set includes an interactive element and the second data set does not include an interactive element;

wherein the first data set in the particular set of content is ranked higher than the second data set in the particular set of content based on the first data set including an interactive element and the second data set not including an interactive element.

16. The system of claim 13, the operations further comprising:

training a machine learning model to compute a ranking corresponding respectively to each data set of the particular set of content, the training comprising:

obtaining training data sets, each training data set of historical data comprising historical data associated with actions of one or more users, wherein the historical data indicates the one or more users navigate to data sets of a first type more frequently than data sets of a second type;

training the machine learning model based on the training data sets;

receiving a communication from a supplier comprising a first set of content including a plurality of data sets;

applying the machine learning model to compute a respective ranking for each of the plurality of data sets of the first set of content, the applying comprising:

analyzing the set of content to determine a respective set of attributes associated with each data set; and computing a respective ranking based on the data set and the first set of attributes associated with the data set, such that the first data set in the particular set of content is ranked higher than the second data set in the particular set of content.

17. The system of claim 16, wherein the first data set and the second data set are part of different categories.

* * * * *